United States Patent
Kilroy

(10) Patent No.: US 7,890,507 B2
(45) Date of Patent: Feb. 15, 2011

(54) SYSTEM AND METHOD OF JOINING DATA OBTAINED FROM HORIZONTALLY AND VERTICALLY PARTITIONED HETEROGENEOUS DATA STORES USING STRING-BASED LOCATION TRANSPARENT SEARCH EXPRESSIONS

(75) Inventor: John F. Kilroy, Portsmouth, NH (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 11/065,967

(22) Filed: Feb. 25, 2005

(65) Prior Publication Data

US 2006/0195420 A1 Aug. 31, 2006

(51) Int. Cl.
G06F 7/00 (2006.01)
G06F 17/30 (2006.01)

(52) U.S. Cl. .................. 707/736; 707/740; 707/760

(58) Field of Classification Search .................. 707/736, 707/740, 760
See application file for complete search history.

(56) References Cited

U.S. PATENT DOCUMENTS

| | | | |
|---|---|---|---|
| 6,006,214 A | 12/1999 | Carey et al. | |
| 6,067,548 A * | 5/2000 | Cheng ..................... | 707/103 R |
| 6,374,252 B1 | 4/2002 | Althoff et al. | |
| 6,484,177 B1 * | 11/2002 | Van Huben et al. ............ | 707/10 |
| 6,650,998 B1 * | 11/2003 | Rutledge et al. ............ | 701/211 |
| 6,658,407 B1 | 12/2003 | Bailey | |
| 6,748,374 B1 * | 6/2004 | Madan et al. .................. | 707/3 |
| 7,392,509 B2 | 6/2008 | Sinha et al. | |
| 2002/0174097 A1 * | 11/2002 | Rusch et al. .................... | 707/1 |
| 2003/0041147 A1 | 2/2003 | van den Oord et al. | |
| 2003/0154191 A1 | 8/2003 | Fish et al. | |
| 2003/0208493 A1 * | 11/2003 | Hall et al. .................... | 707/100 |
| 2004/0243576 A1 * | 12/2004 | Shrivastava et al. ............ | 707/5 |
| 2005/0055351 A1 * | 3/2005 | Barton et al. .................. | 707/10 |

FOREIGN PATENT DOCUMENTS

WO WO 99/09494 2/1999

OTHER PUBLICATIONS

Agrawal, Sanjay et al.; "Integrating Vertical and Horizontal Partitioning into Automated Physical Database Design"; pp. 359-370.
Office Action mailed Jun. 20, 2008 for U.S. Appl. No. 11/065,968.
Notice of Allowance mailed Nov. 6, 2008 for U.S. Appl. No. 11/065,968.
Non-Final Office Action dated Mar. 31, 2009 for related co-pending U.S. Appl. No. 11/318,915.

* cited by examiner

Primary Examiner—John R. Cottingham
Assistant Examiner—Mariela D Reyes
(74) Attorney, Agent, or Firm—Guerin & Rodriguez, LLP; Michael A. Rodriguez

(57) ABSTRACT

Described are a system and method for accepting a string-based search expression, parsing the search expression into an expression tree, distributing the tree (or portion thereof) across heterogeneous repositories, and merging the results. The system is data-location transparent, encapsulates a federation model within query nodes and query trees. A client application produces and issues the search expression to the system. One type of expression tree node is an attribute node corresponding to an attribute included in the search expression. Metadata is associated with the attribute node for identifying each repository that supports the attribute represented by that attribute node. A call passes to the expression tree to perform the search, which occurs in a recursive-descent traversal of the tree. The search completes in a single tree traversal. Sub-trees receive a relevant portion of the search expression to translate into a query expression specific for each type of searched repository.

17 Claims, 10 Drawing Sheets

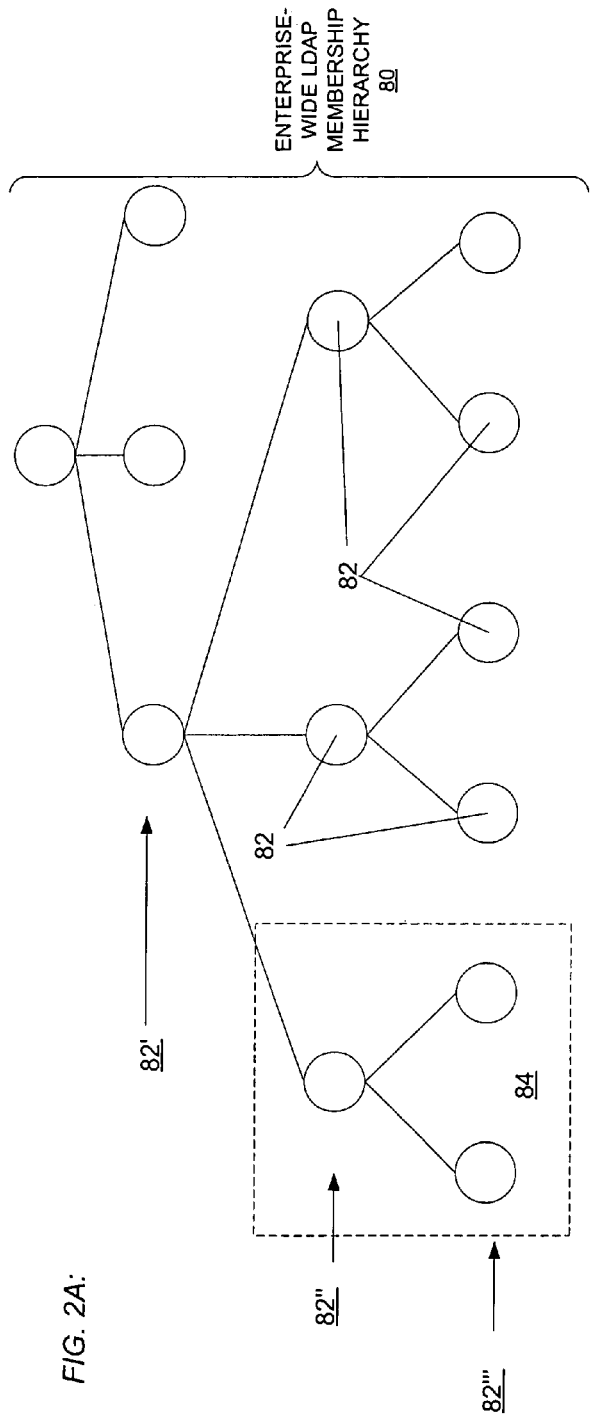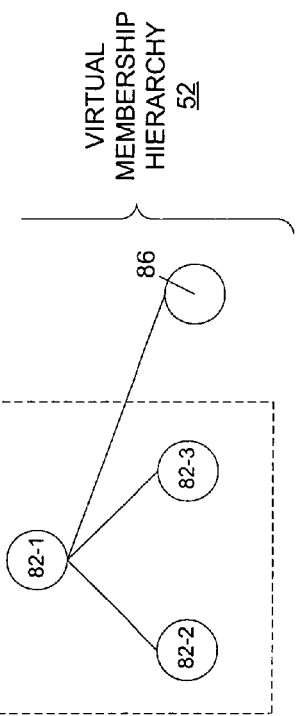
FIG. 2A:
FIG. 2B:

SYSTEM AND METHOD OF JOINING DATA OBTAINED FROM HORIZONTALLY AND VERTICALLY PARTITIONED HETEROGENEOUS DATA STORES USING STRING-BASED LOCATION TRANSPARENT SEARCH EXPRESSIONS

FIELD OF THE INVENTION

The invention relates generally to electronic databases. More specifically, the invention relates to a system and method for joining data from horizontally and vertically partitioned heterogeneous data stores using string-based search expressions.

BACKGROUND

Many organizations and enterprises provide computerized directory services for locating members of the organization and for obtaining information about the members. Typically, a user of an employee locator or people-finder application program enters a portion of the name of the sought-after individual, or other relevant information, into a search field. The user then initiates the search by activating a graphical user interface button displayed for that purpose. The application program then generates a query expression based on the user-supplied input and issues the query to a directory system. Within this directory system, the information sought for by the query may reside across multiple heterogeneous data stores (or repositories).

Directory systems operating over heterogeneous repositories generally provide an application program interface (API) for searching the virtual repository (i.e., an abstraction of the multiple heterogeneous data stores and instances). Often, however, the client application bears the complexity of the query construction. For instance, the client application may need to conform the query expression to a proprietary query object model that is cumbersome and constrained by query-construction artifacts, such as an inability to express precedence of evaluation with parentheses or to specify logical OR operations. In such systems, constructing simple queries can involve an inordinate amount of program code.

Moreover, programmers often need to specify the locations in the data stores, (i.e., the client application needs to know the table and column names of the various repositories, must repeat the query across the horizontal repositories, and then specify the join conditions against the vertical repositories). Thus, the client application needs to be attribute-location aware, issue multiple queries, and manually join the data returned by the queries. Other directory system implementations cannot work with heterogeneous data stores (e.g., LDAP—Lightweight Directory Access Protocol) or support horizontal and vertical federation of query results, and still other systems are unable to accommodate dynamic definition of attributes.

SUMMARY

In one aspect, the invention features a method for performing a search of a virtual repository. The method comprises receiving a string-based search expression and generating an expression tree of nodes based on the string-based search expression. One of the nodes of the expression tree is an attribute node that corresponds to an attribute included in the string-based search expression. Metadata is associated with the attribute node in the expression tree. This metadata identifies one or more repositories that support the attribute represented by that attribute node.

In another aspect, the invention features a server system comprising a query processor receiving a string-based search expression. The query processor includes a parser for generating an expression tree of nodes based on the string-based search expression. One of the nodes of the expression tree is an attribute node that corresponds to an attribute included in the string-based search expression. The parser identifies one or more repositories that support the attribute and associates the attribute node with metadata that links the attribute node with the identified one or more repositories.

In yet another aspect, the invention features an apparatus comprising means for receiving a string-based search expression and means for generating an expression tree of nodes based on the string-based search expression. One of the nodes of the expression tree is an attribute node that corresponds to an attribute included in the string-based search expression. The apparatus also includes means for associating metadata with the attribute node in the expression tree. The metadata identifies one or more repositories that support the attribute represented by that attribute node.

In still another aspect, the invention features a computer program product for use with a computer system. The computer program product comprises a computer useable medium having embodied therein program code. The program code includes program code for receiving a string-based search expression and program code for generating an expression tree of nodes based on the string-based search expression. One of the nodes of the expression tree is an attribute node that corresponds to an attribute included in the string-based search expression. The computer program product also includes program code for associating metadata with the attribute node in the expression tree. The metadata identifies one or more repositories that support the attribute represented by that attribute node.

In still yet another aspect, the invention features a computer data signal embodied in a carrier wave for use with a computer system having a display and capable of generating a user interface through which a user may interact with the computer system. The computer data signal includes program code for receiving a string-based search expression and program code for generating an expression tree of nodes based on the string-based search expression. One of the nodes of the expression tree is an attribute node that corresponds to an attribute included in the string-based search expression. The computer data signal also includes program code for associating metadata with the attribute node in the expression tree. The metadata identifies one or more repositories that support the attribute represented by that attribute node.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 2A is a diagram illustrating an example of an enterprise-wide Lightweight Direct Access Protocol (LDAP) membership hierarchy.

FIG. 2B is a diagram illustrating an example of a virtual membership comprised of members from a subset of the enterprise-wide LDAP membership and members from a relational database system.

DETAILED DESCRIPTION

The present invention features systems and methods for generating string-based search expressions based on a lexical structure of the user-supplied input. A client application tokenizes the user-supplied input and selects a template based on the lexical structure of that input. The client application substitutes the tokens derived from the user input into designated locations within the template to produce the string-based search expression. Templates are readily modifiable. Administrators can dynamically change the content of the string-based search expressions by modifying a template, e.g., in response to adding or removing attributes supported by the heterogeneous repositories. Modifications to the templates do not require any changes to the client application.

Further, in one embodiment, these templates, and thus search expressions, have a format that many administrators and programmers should consider familiar and intuitive. This format, herein referred to as Generic Query Language or GQL, can simplify the process of making changes to the templates. Read from left to right, search expressions in the GQL format use familiar Boolean operators (AND and OR) and parenthetical sub-expressions to indicate precedence of evaluation. Search expressions in GQL format are also readily translatable to repository-specific query expressions, such as LDAP filter expressions and SQL WHERE expressions, for use in search environments having multiple heterogeneous repositories in which data may be horizontally and vertically partitioned. Although described herein primarily with reference to searching for members in a virtual directory environment, the design of templates and search expressions can apply to any topic or subject matter for which an individual may perform computerized searches.

In addition, the client application does not need to determine which repositories can support each of the attributes in a search expression, nor do the search expressions need to identify these repository locations. An application server provides a framework for processing search expressions and determining which repositories can support the attributes in a search expression. A parser constructs an expression tree based on the search expression and initiates a search by calling a root node of the expression tree. The expression tree issues relevant portions of the search expression to repository adapters that translate these portions into repository-specific query expressions and submit the query expressions to the appropriate repositories. Federation nodes, if any within the expression tree, can merge search results obtained from horizontally and vertically partitioned repositories. Advantageously, any changes to this framework do not affect the manner in which the client application can generate string-based search expressions (i.e., there is no need to recompile a client application if system framework changes).

Figure 1:
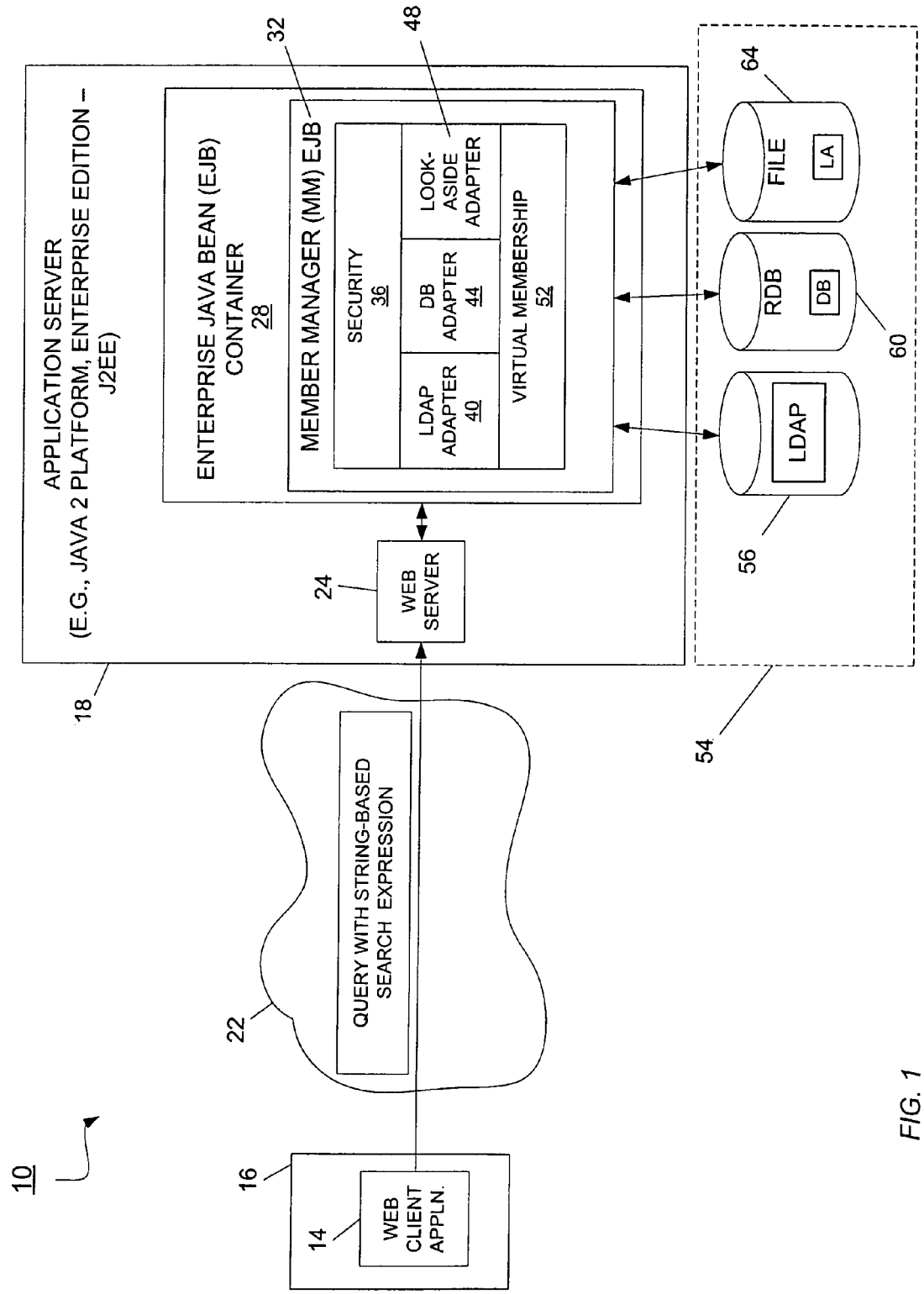
FIG. 1 is a block diagram of a system embodying the invention for generating and distributing a string-based search expression across heterogeneous data stores.

FIG. 1 shows an embodiment of a system 10 for generating and distributing a string-based search expression to a set of heterogeneous data stores in accordance with the invention. The system 10 includes a Web client application 14 in communication with an application server 18 over a network 22 (e.g., LAN, WAN). In one embodiment, the Web client application 14 is an application program that provides name-search functionality, e.g., the client application enables users to search for individuals in an organization (or enterprise) and view detailed information about those individuals, for example, their names, phone numbers, job titles. A system administrator can customize the operation of the client application 14 to present search results to the searcher in one of a plurality of customized views, such as person records and organizational charts. An exemplary implementation of this embodiment of the Web client application 14 is Lotus Workplace People Finder®, produced by IBM/Lotus Corporation of Cambridge, Mass. In other embodiments, the Web client application 14 can provide a different type of search functionality other than name-search functionality without departing from the principles of the invention, e.g., search for stock quotes, address locations, dining establishments, etc.

The Web client application 14 executes on a computing device 16 having a processor, a user interface, a display screen, an input device (e.g., keyboard, a mouse, trackball, touch-pad, touch-screen, etc), and persistent storage for storing data and software programs. Exemplary embodiments of the client computing device 16 include, but are not limited to, a personal computer (PC), a Macintosh computer, a workstation, laptop computer, a hand-held device such as a personal digital assistant (PDA) and a cellular phone, a network terminal, and an online gaming device such as Sony's PLAYSTATION™.

The application server 18 includes a Web server 24, i.e., a software program capable of servicing Hypertext Transport Protocol (HTTP) requests received from the Web client application 14 over the network 22. In one embodiment, the application server 18 is a Java 2 Platform, Enterprise Edition (J2EE) application server. Core components of the J2EE platform are Enterprise JavaBeans (EJBs), maintained in an enterprise java bean (EJB) container 28. The application server 18 can be used to deploy, integrate, execute, and manage a variety of e-business applications. One exemplary implementation of the application server 18 is the Websphere® Application Server produced by IBM Corporation.

One of the enterprise java beans within the EJB container 28 is a Member Manager enterprise java bean 32 (hereafter, Member Manager). The Member Manager 32 is a component of the application server 18 that produces a common schema of attributes for people, groups, organizations, and organizational units used by the client application 14, and performs directory lookups and membership management. The Web server 24 is in communication with the Member Manager 32 for collaborating in the return of content to the Web client application 14 in response to, e.g., an HTTP request. The Member Manager 32 described herein serves to illustrate a particular embodiment of the invention. Other types of applications involving the accessing and searching of heterogeneous repositories can also be designed to practice the invention.

The Member Manager 32 includes security software 36 for authentication processes, a Lightweight Directory Access Protocol (LDAP) adapter 40, a Relational Database (DB) adapter 44, and a look-aside (LA) adapter 48. Each adapter 40, 44, 48 is associated with a particular data store, i.e., a place, such as a database system, file, or directory, where data is stored. Each adapter is configured to translate a search expression, produced by the client application 14, into a repository-specific query expression understood by the repository with which that adapter is associated. In general, the adapters are in communication with the repositories for purposes of submitting query expressions to the repositories and receiving search results in response. More specifically, the LDAP adapter 40 is in communication with a LDAP repository 56, the DB adapter 44 is in communication with a RDB (DB) repository 60, and the LA adapter 48 is in communication with a look-aside (LA) repository 64.

The LDAP, DB, and LA repositories comprise a set 54 of heterogeneous repositories available to the Member Manager 32 for performing directory searches and membership management. Example implementations of the LDAP repository 56 include IBM SecureWay Directory, Lotus Domino Directory Services, and Microsoft Active Directory. The DB repository 60 can be implemented, for example, as an IBM DB2 Universal Database or an Oracle relational database. The LA repository 64 can be implemented, for example, as a flat file or as a relational database. Although FIG. 1 shows only one LA repository, the invention can extend to a plurality of look-aside repositories.

Together, the various repositories 56, 60, 64 combine to provide a virtual repository containing a virtual hierarchy of members who may be found in the set of repositories 54. Although described herein as being comprised of heterogeneous repositories, this virtual repository does not need to have repositories of different types in order to practice the invention. As an example, instead of being comprised of three different types of repositories (i.e., the LDAP 56, DB 60, and LA 64 repositories), the virtual repository can be comprised of one or more RDB repositories. Nonetheless, illustrating the virtual repository as configured with heterogeneous repositories serves to demonstrate an advantageous capability of the invention to distribute a query over different types of repositories.

The Member Manager 32 produces this virtual hierarchy of members. In one embodiment, this virtual hierarchy, also referred to as a virtual membership 52, is a composite of members in the LDAP repository 56 and of members in the DB repository 60. For example, FIG. 2A shows an enterprise-wide LDAP membership hierarchy 80 comprised of nodes 82 (only some of which are labeled). One level of nodes 82' can represent geographical offices (e.g., U.S. office, Europe office, Asia office), a lower level of the nodes 82" can represent departments within each geographical office (e.g., human resources, legal department, corporate department), and leaf nodes 82''' can represent particular members of these departments.

The virtual membership 52 produced by the Member Manager 32 is a combination of the members in the LDAP repository 56 and in the DB repository 60. The LDAP repository 56 can support all or a proper subset of the nodes 82 of the enterprise-wide LDAP membership hierarchy 80. In general, the DB repository 60 can contain members of the organization not present in the LDAP repository 56 (and, possibly, some overlap of membership with the LDAP repository). FIG. 2B shows an overly simplified exemplary embodiment of the virtual membership 52 comprised of a combination of a subset 84 of the enterprise-wide LDAP membership 80 and an additional member node 86 from the DB repository 60. The LDAP and DB repositories can each support a plurality of objects, such as member, organization, and group.

Figure 3:
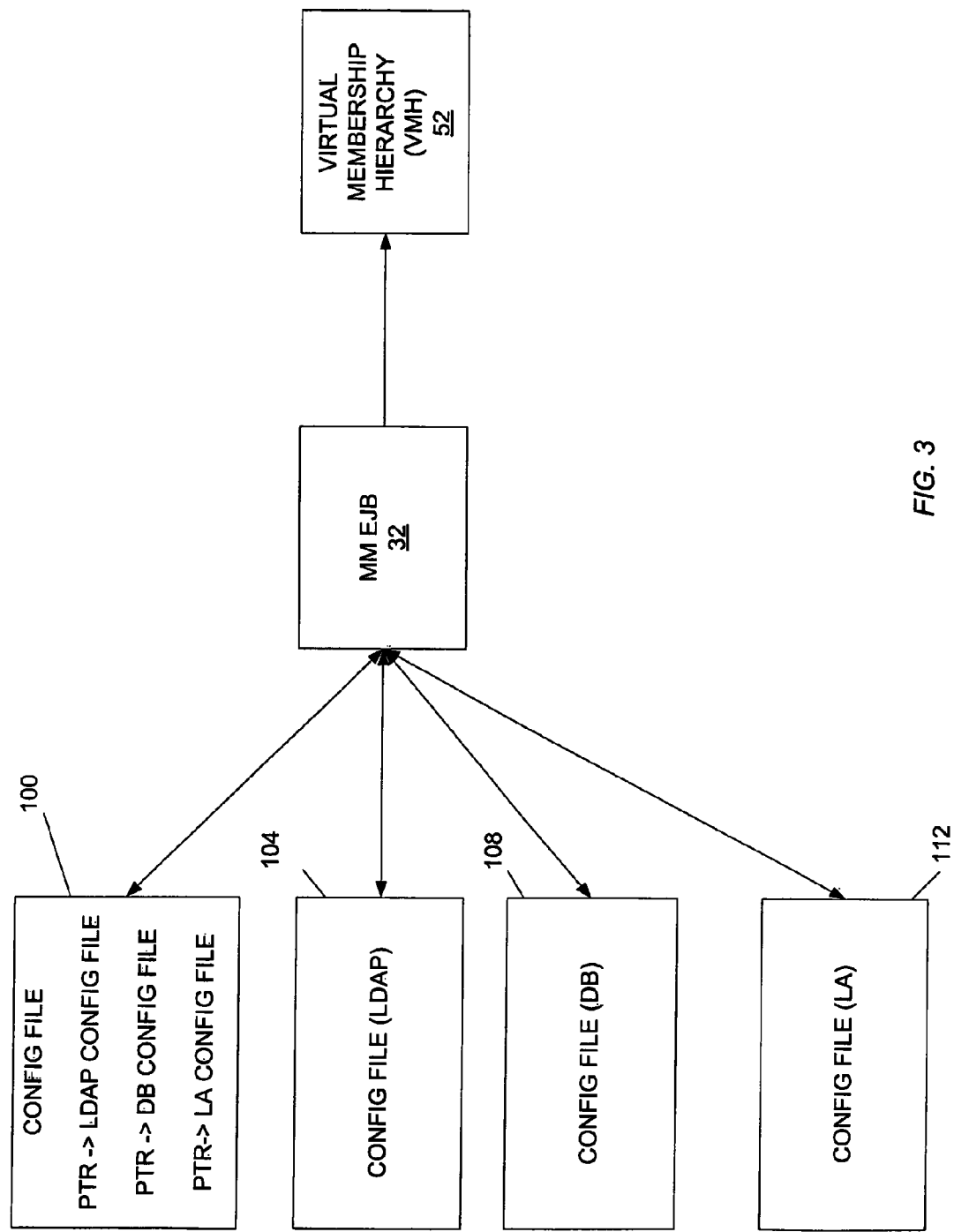
FIG. 3 is a diagram illustrating an embodiment of components used by the system in the construction of the virtual membership.

FIG. 3 shows the various components employed by the Member Manager 32 in the generation of the virtual membership/directory system 52. During operation, the Member Manager 32 accesses a configuration file 100 (e.g., XML or Extensible Markup Language). This configuration file 100 operates to identify which repository adapters the Member Manager 32 calls in the development of the virtual membership/directory system. The configuration file 100 includes one or more pointers to other configuration files 104, 108, 112. Each of those other configuration files is associated with one of the repository adapters. Here, for example, the configuration file 104 is associated with the LDAP adapter 40, the configuration file 108 with the DB adapter 44, and the configuration file 112 with the LA adapter 48. The configuration files 104, 108, 112 include information for constructing the virtual membership 52, such as an identification of the properties, such as membership hierarchy, nodes, and object types, supported by each adapter. For example, with reference to the virtual membership 52 of FIG. 2B, the LDAP configuration file 104 identifies the nodes 82-1, 82-2, and 82-3 as part of the virtual membership and the DB configuration file 108 identifies node 86 as part of the virtual membership.

The configuration files 104, 108, and 112 also indicate which attributes are supported by the respective repositories, thus providing a means for identifying which repositories are to be accessed when presented with certain attributes within a search expression. In general, the LDAP and DB repositories support a common set of attributes. Data stored in the LDAP and DB repositories are considered horizontally partitioned into disjoint sets of rows capable of being stored and accessed separately.

The LA repository 60 provides a means by which new attributes, i.e., those not found in the LDAP and DB repositories, can be added to the profiles of members in the virtual membership 52 without having to change the schema of either the LDAP or DB repository. Data stored in the LA repository 60 are considered vertically partitioned into disjoint sets of columns capable of being stored and accessed separately. Accordingly, new attributes can be added ad hoc to the profiles of the members by incorporating one or more LA repositories that support the new attributes. A new LA repository can be "plugged-in" to the system of the invention by associating a configuration file with that new LA repository and inserting a pointer to this configuration file within the configuration file 100.

Figure 4:
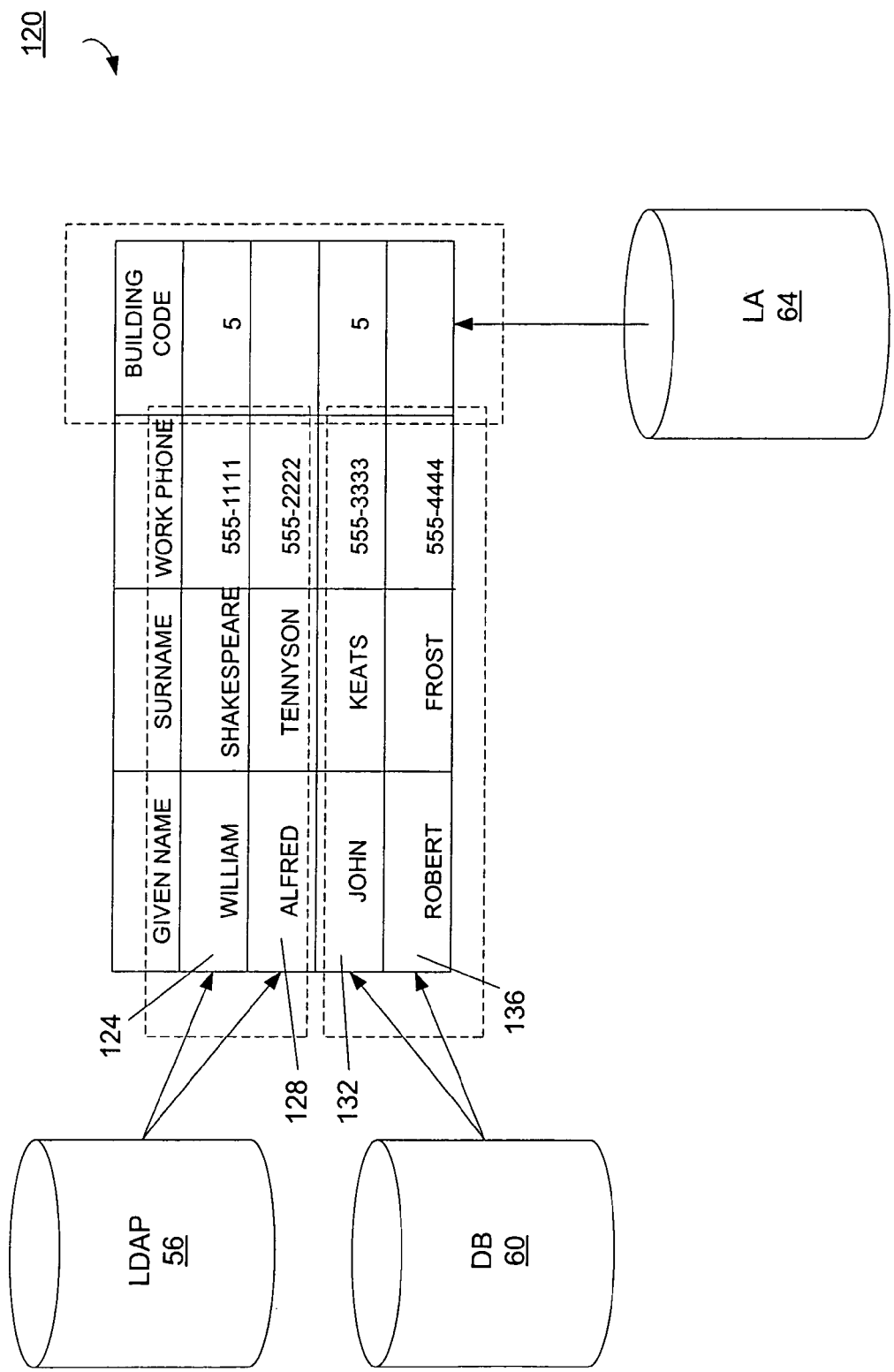
FIG. 4 is an example of a member set produced by merging horizontally partitioned data and vertically partitioned data obtained from heterogeneous data stores.

FIG. 4 shows an example of a member set 120 including four exemplary members of the virtual membership 52. The member set 120 includes data collected across the heterogeneous repositories 56, 60, and 64. Members 124 and 128 reside in the LDAP repository 56, and members 132 and 136 reside in the DB repository. Attributes supported by each of these repositories 56, 60 include surname (sn), given name (givenname), and work phone number. Any member may have a building code within their profile. This attribute is hosted by the LA repository 64. Here, only members 124 and 132 have an associated building code equal to 5.

Figure 5A:
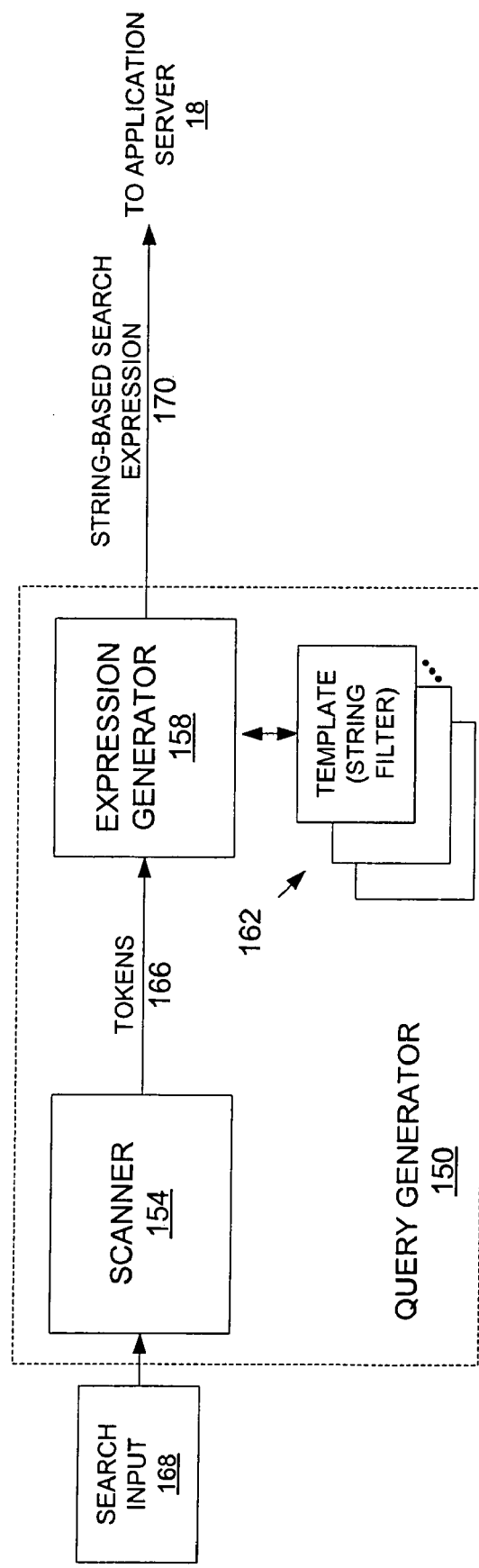
FIG. 5A is a block diagram of an embodiment of a query generator for generating a string-based search expression in accordance with the invention.

FIG. 5A shows a query generator 150 including a scanner 154, an expression generator 158, and a plurality of templates 162. In general, the query generator 150 receives a search input 168, typically user-supplied, and produces a search expression 170 based on the lexical structure of the search input 168. In one embodiment, the query generator 150 executes on the client-computing device 16. In another embodiment, the query generator 150 executes on the application server 18 (i.e., the user-supplied input 168, instead of a string-based search expression, passes over the network 22).

The content of the search input 168 depends upon the type of search system deployed on the application server 18. For example, for virtual membership/directory systems, the search input 168 typically includes first names, last names, location information, or combinations thereof thought by the searcher to be useful in finding for one or more members in the virtual directory system provided by the Member Manager 32 (FIG. 1). The search input 168 may include incomplete portions of names, wildcard characters, and certain punctuation. For stock price and analysis systems, for example, the content of the search input is generally related to stock-related terms.

The search expression 170 produced by the query generator 150 has a string-based format. In one embodiment, this format is called an LDAP filter expression format. In a preferred embodiment, this format is a generic query language (GQL) expression format. When passed to the Member Manager 32, the search expression 170 may be embedded within a query (i.e., call, command, or request for a search). In one embodiment, this query includes content as illustrated by the exemplary code:

```
// set the return attributes and make the call for a search
StringSet returnAttrs = StringSet.Factory.getInstance(3);
returnAttrs.add("givenname");    // Example of 1st return attribute
returnAttrs.add("sn");           // Example of 2nd return attribute
returnAttrs.add("buildingcode"); // Example of 3rd return attribute
MemberSet ms =
memberService.search(MemberServiceConstants.MEMBER_TYPE_PERSON, searchbases,
searchexpression, StringSet returnAttrs, searchTimeOut, maxSearchResults);
```

In this query expression, the variable "searchexpression" represents the passed-in search expression 170, e.g., "(givenname=Keats) OR (sn=Keats) AND (buildingcode=5)—which is a GQL search expression. The search attributes (also called query attributes) in the search expression are "givenname," "sn," and "buildingcode." In this query expression, the return attributes (returnAttrs) are the same as the search attributes, namely "givenname," "sn," and "buildingcode." In general, search attributes are used to restrict the set of objects (e.g., members) returned from a repository, whereas return attributes define the information about each object that is sought. Both types of attributes are essentially fields associated with the objects within the repository. The return attributes and search attributes can have zero, one, or more attributes in common. The searchbases variable operates to limit the scope of the search by providing a point in the hierarchy at which to start the search. MemberType identifies the type of information sought in the search, e.g., people, groups, organizations, organizational units, etc.

For receiving and processing query expressions of this type, the Member Manager 32 makes available (i.e., as part of an API) a corresponding data type: MemberSet search(short memberType, SearchCriteria searchCriteria, StringSet resultAttributes, int searchTimeOut, int maxSearchResults). When the search expression attributes and the return attributes (returnAttrs) span horizontally and vertically partitioned repositories, the system federates the results returned by these repositories.

In one embodiment, the Member Manager 32 (FIG. 1) is capable of handling either format for generating repository-specific query expressions when searching the set of heterogeneous repositories 54 (FIG. 1). The ability of the Member Manager 32 to process search expressions in an LDAP filter expression format enables client applications that use legacy LDAP filter expressions to operate with the directory search system of the invention.

The GQL format provides a repository-neutral form for search expressions. The attributes, operators, and values in GQL search expressions are expressed in an infix notation. Parentheses can appear in these search expressions to indicate precedence of evaluation. In one embodiment, GQL search expressions generally have the form of (attribute name OPERATOR value) BOOLEAN OPERATOR (attribute name OPERATOR value). Boolean operators supported by the invention include AND and OR. The invention can extend to other types of operators.

To produce the search expression 170, the expression generator 158 is in communication with the scanner 154 to receive tokens derived from the input string 168. The expression generator 158 is also in communication with the templates 162 to select one of the templates for use in the construction of the search expression 170. Each template 162 is associated with a different, valid structure of user-supplied input and provides a template expression appropriate for that input structure. One of the templates 162 can be a default template in the event the lexical structure does not correspond to any of the templates 162. For embodiments in which the search expression 170 is to have a GQL format, the templates 162 provide repository-neutral (i.e., GQL) template expressions.

Consider, for example, the following three exemplary templates. Herein, the comma (",") is a (user-definable and user-modifiable) special delimiter (specDel) that is considered in interpreting the structure of the user input. Other special delimiters, such as semi-colons and colon, can be used without departing from the principles of the invention. In addition, special delimiters can include more than one character. Tokens in the user input stream can include alphanumeric text separated, in one embodiment, by blank spaces and/or a special delimiter.

case 0: One word (i.e., token) template, (e.g., "Keats").

Select template 0 for input having the general sequence of "token"

template 0 expression=((cn=?0*) OR (givenName=?0*) OR (sn=?0*) OR (displayName=?0*))

case 1: Two word (token) template (i.e., "John Keats").

Select template 1 for input having the general sequence of "token token"

template 1 expression=((cn=?0*?1*) OR (cn=?1*?0*) OR (givenName=?0?1*) OR (sn=?0?1*) OR ((givenName=?0*) AND (sn=?1*)) OR ((givenName=?1*) AND (sn=?0*)) OR (displayName=?0*?1*))

case 2: Two words (tokens), one comma (special delimiter) template (e.g., "Keats, John").

Select template 2 for input having the general structure of "token, token"—In this example, the user specified that the special delimiter is a comma.

template 2 expression=((cn=?0*?1*) OR (cn=?1*?0*) OR (givenName=?1* ?0) OR (sn=?1* ?0) OR ((givenName=?1*) AND (sn=?0)) OR (displayName=?0*?1*))

It is to be understood that fewer or more than these three templates can be defined for a given name-search system.

Further, the particular template expressions associated with each template can vary from those described. In accordance with the invention, various aspects of templates and template expressions are user-specifiable and user-modifiable. Such aspects include enabling a user to specify (1) the particular attributes, operators, and evaluation precedence in template expressions, (2) how to tokenize the user input stream, including whether and which special delimiters and blank spacing are used to delineate tokens, (3) how token sequences, which may include one or more special delimiters or blank spaces, are mapped to particular templates, and (4) how tokens are substituted within a template expression of a selected template. Accordingly, a user can modify (dynamically) any one or combination of these aspects to change the string-based search expression that is generated for a given user-supplied input.

For example, the system can maintain the templates 162 in a file that an administrator can edit with a word processor program. The templates 162 may instead be in separate files, each similarly modifiable. Alternatively, the system can maintain the templates 162 in another file format, i.e., not necessarily modifiable through a word processor, but accessible through a graphical user interface. Consequently, if the administrator desires to alter one or more of the template expressions, e.g., to add a new attribute or to match attribute names in the template expressions with those used in the repositories, changes to the template expressions do not require any recompilation of the client application nor a sophisticated understanding of a search criteria object. In general, administrators and programmers are likely to be familiar with or can readily comprehend the intuitive, infix notation of GQL expressions and can readily add, remove, or change attributes, operators, Boolean operators, and parenthetical expressions.

For embodiments in which the search expression 170 has an LDAP filter expression format, the templates 162 provide repository-specific (i.e., LDAP) template expressions. LDAP filter expressions have a prefix notation and use specific symbols, e.g., "&" and "|" for representing Boolean operations. Thus, template expressions in an LDAP filter expression format can appear less intuitive to administrators than GQL expressions for purposes of making changes to the templates. Notwithstanding, administrators familiar with LDAP filter notation can add, remove, or change attributes, operators, Boolean operators, and parentheses to template expressions.

An advantage of the present invention, referred to as location transparency, is that an administrator who maintains and modifies the templates and a programmer who develops the code for the query generator 150 do not need to know which repositories actually support the various search and return attributes. The client application 14 can thus invoke a query operation and pass a search expression without needing any foreknowledge of which repositories can support the return attributes specified in the query expression or the search attributes in that search expression. The role of determining which repositories support the return attributes and search attributes in the search expression belongs to the Member Manager 32, as described below.

Figure 5B:
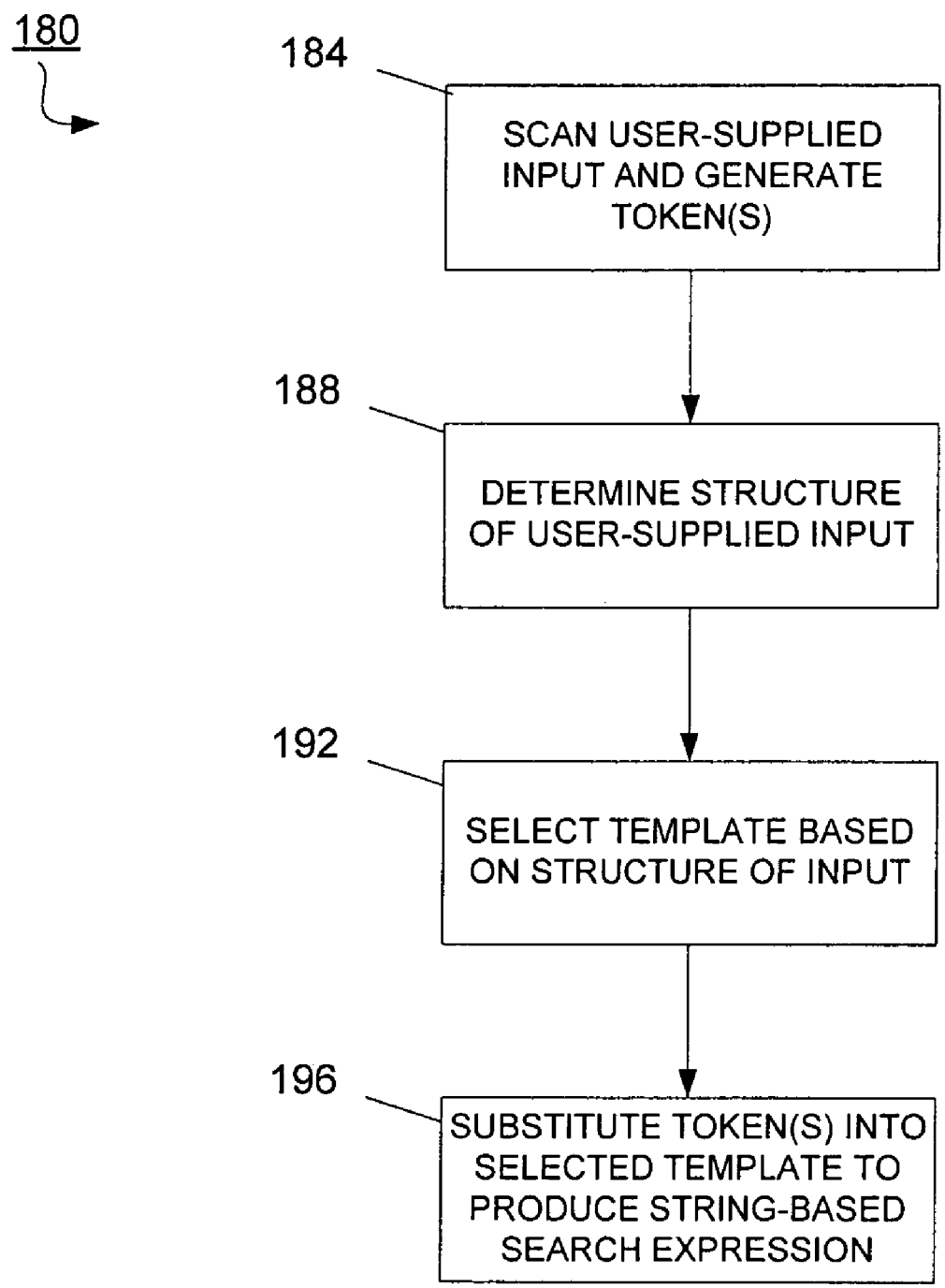
FIG. 5B is a flow diagram of an embodiment of a process for generating a string-based search expression from a user-supplied input.

FIG. 5B shows an embodiment of a process 180 for generating a search expression in accordance with the invention. In the description of the process 180, reference is also made to FIG. 5A. At step 184, the scanner 154 receives and parses the user-supplied input 168 to produce tokens 166 based on the input 168. At step 188, the lexical structure of the user-supplied input is determined (i.e., the number of tokens are counted and positions of any special delimiters within the user input are identified). The tokens 166 pass to the expression generator 158, which selects (step 192) one of the templates 162 based on the lexical structure of the input 168. The expression generator 158 substitutes (step 196) the tokens into the appropriate locations within the selected template to produce the string-based search expression 170. For example, consider a user-supplied input of "Keats, John". From this input, the scanner 154 produces two tokens (1) "Keats"; and (2) "John" and identifies the position of a special delimiter (here, a comma) between the tokens. With respect to the three exemplary templates described above, the expression generator 158 selects the two-token, one comma template (# case 2:) and produces the following string-based search expression by substituting "John" into placeholders for token #0 and "Keats" into placeholders for token #1:

search expression="((cn=John*Keats*) OR (cn=Keats*John*) OR (givenName=Keats* John) OR (sn=Keats* John) OR ((givenName=Keats*) AND (sn=John)) OR (displayName=John*Keats*))", where cn represents common name, sn represents surname, and * represents a wildcard character.

Figure 6A:
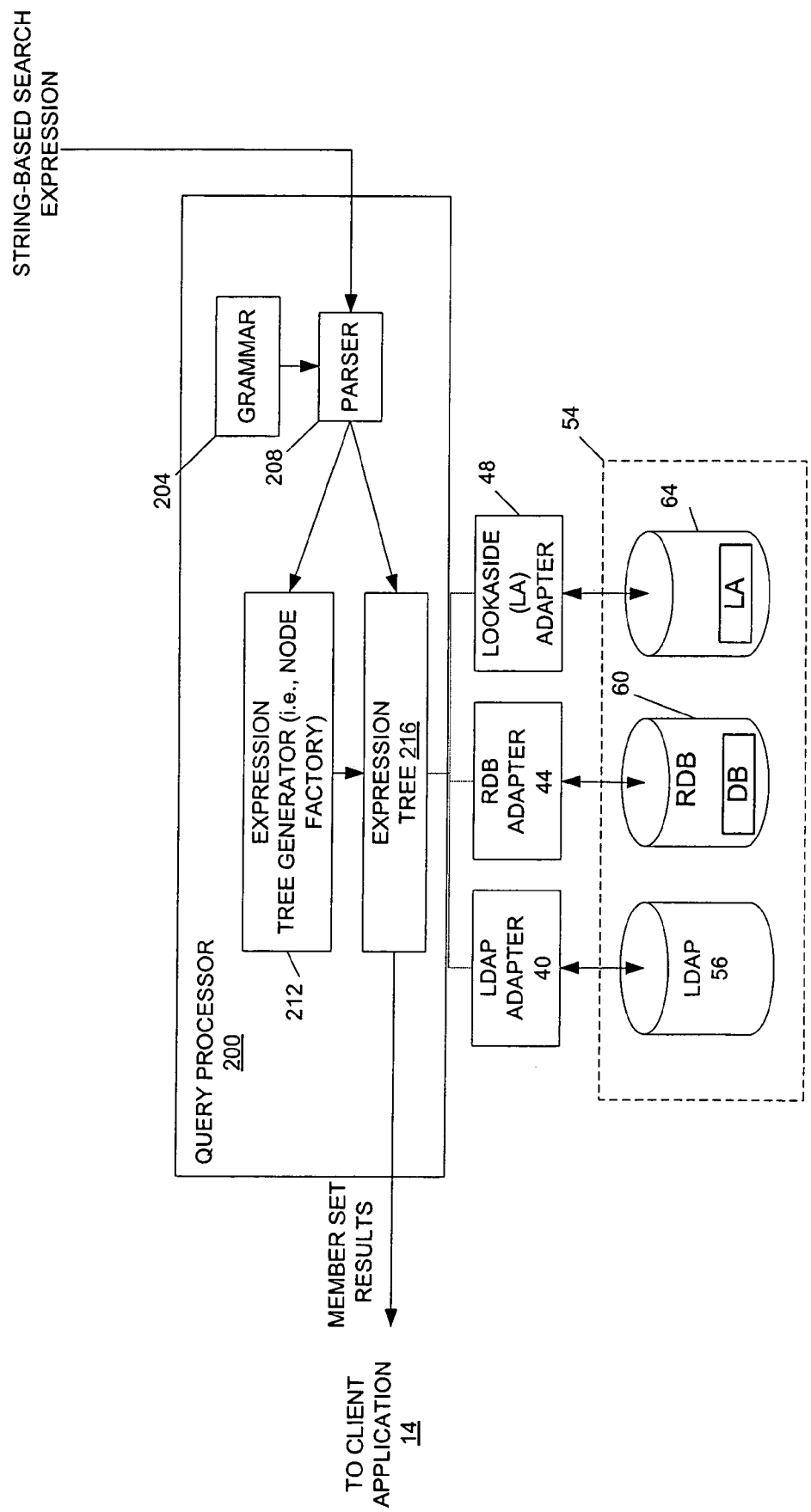
FIG. 6A is a block diagram of an embodiment of a search-expression processor for interpreting the search expression, translating the search expression into repository-specific expressions, distributing the repository-specific expressions to the appropriate repositories, and merging search results.

FIG. 6A shows an embodiment of a query processor 200 for processing the query having the string-based search expression 170, here, e.g., produced by the query generator 150. The query processor 200 is a component of the Member Manager 32 (FIG. 1) and includes a grammar 204 and a parser 208 derived from the grammar 204.

```
//Grammar
Goal ::= conditional_exp
conditional_exp ::= conditional_or_exp
conditional_or_exp ::= conditional_and_exp
conditional_or_exp ::= conditional_or_exp OR conditional_and_exp
conditional_and_exp ::= relational_exp
relational_exp ::= name op non_numeric_literal
relational_exp ::= name IN in_exp
in_exp ::= '('stringLiteralList ')'
stringLiteralList ::= stringLiteralList ',' STRING_LITERAL
stringLiteralList ::= STRING_LITERAL
relational_exp ::= '(' conditional_exp ')'
non_numeric_literal ::= STRING_LITERAL
name ::= IDENTIFIER
op ::= LT
op ::= LTEQ
op ::= GT
op ::= GTEQ
op ::= EQ
op ::= IN
```

This exemplary grammar 204 generally accepts string-based search expressions of the form: (attributeName OPERATOR value) AND/OR (attributeName OPERATOR value). Parentheses in a string-based search expression specify precedence of evaluation. In one embodiment, the parser 208 is a LR(1) parser and communicates with an expression tree generator 212 to produce an expression tree 216 based on the search expression 170.

Figure 6B:
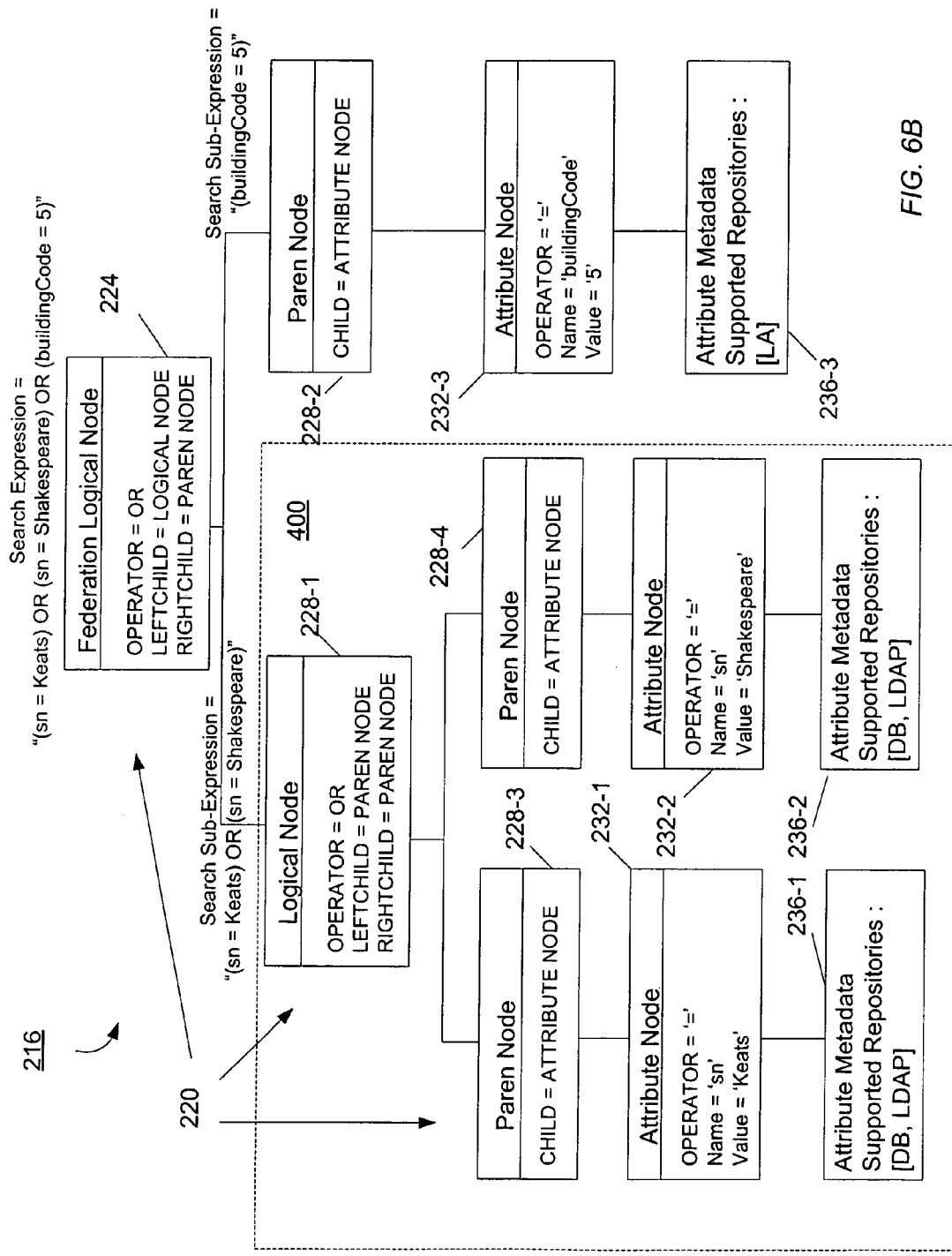
FIG. 6B is a diagram of an embodiment of an expression tree produced by the search expression processor.

FIG. 6B shows an embodiment of the expression tree 216 having a plurality of nodes 220, including a root node 224, intermediate nodes 228-1, 228-2, 228-3, 228-4 (generally, 228), and leaf nodes 232-1, 232-2, and 232-3 (generally, 232). This example of expression tree corresponds to the search expression: "(sn=Keats) OR (sn=Shakespeare) OR (buildingCode=5)". In one embodiment, intermediate nodes include logical nodes and parenthesis (paren) nodes. Leaf nodes 232 correspond to attributes in the search expression. Hereafter, leaf nodes are also referred to as attribute nodes. Each attribute node 232 has attribute metadata 236 associated with that attribute node. The attribute metadata 236 identifies one or more particular repositories that supports the attribute of the attribute node. For example, the attribute metadata 236-1 and 236-2 indicate that the LDAP and DB repositories support the attribute "sn", and the attribute metadata 236-3 indicates that the LA repository supports the attribute "building-Code". In addition, the metadata can include attribute name mapping (i.e., translating between attribute names of the virtual repository and the attribute names of the actual repository, e.g., "sn" to "lastName"). Other information represented by the metadata can include attribute-type information, e.g., String, date, integer, etc.

The root node 224 and intermediate nodes 228 can also each be a federation node. A federation node is a node that has children sub-trees that derive their associated attributes from different repositories. For example, the root node 224 is a federation logical node because its left child sub-tree derives its attributes from the LDAP (56) and DB (60) repositories, whereas its right child sub-tree derives its attribute from the LA repository 64. The intermediate logical node 228-1 is not a federation node because its left and right child sub-trees derive its attributes from the same set of repositories (here, LDAP and DB).

Figure 6C:
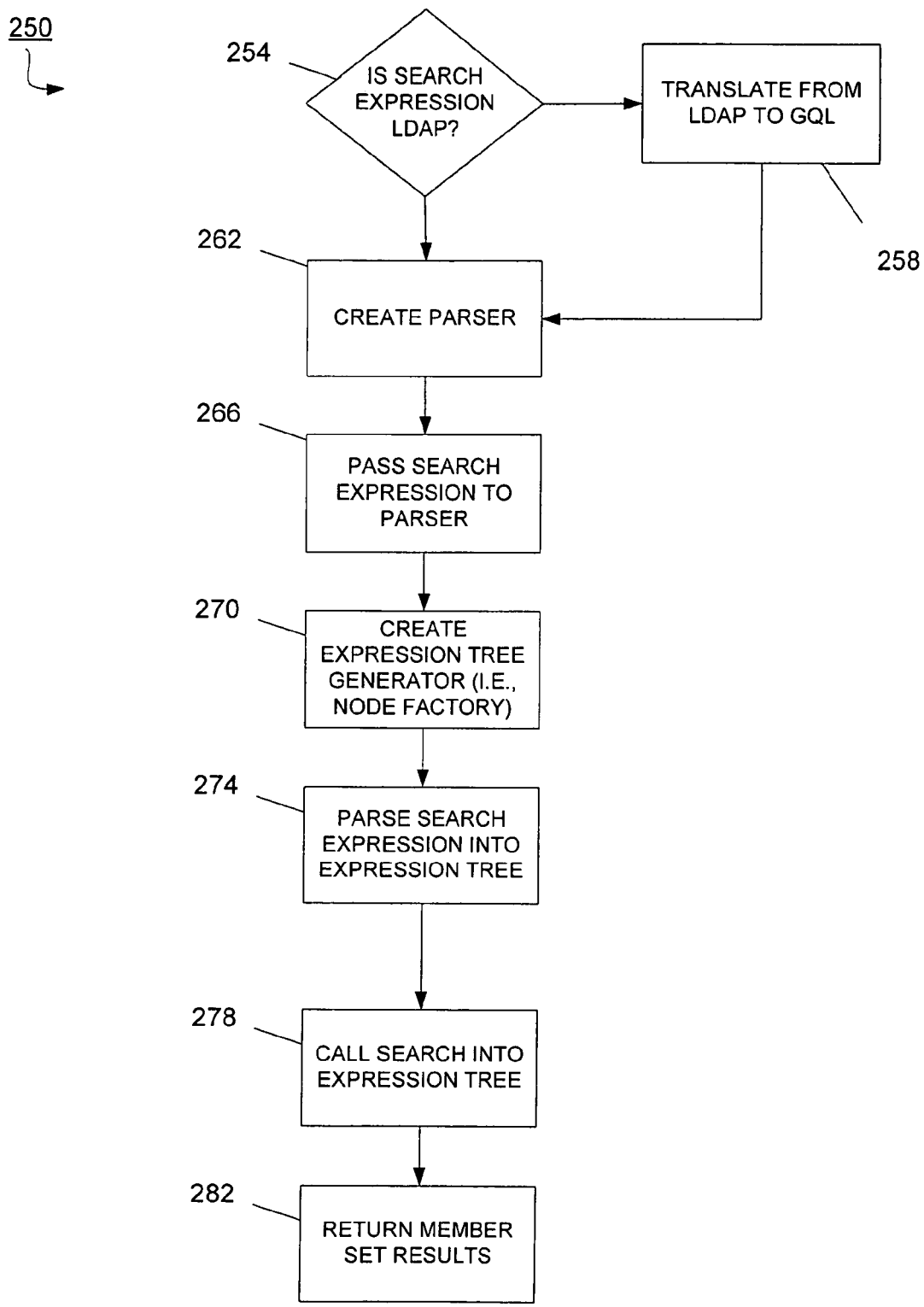
FIG. 6C is a flow diagram of an embodiment of a process for processing the search expression to produce an expression tree used to perform the search.

FIG. 6C shows an embodiment of a process 250 for performing a search based on a search expression received from the client application 14. In the description of this process 250, reference is also made to FIG. 6A. In one embodiment, the query generator 150 of FIG. 5A produces the search expression processed by the query processor 200 of FIG. 6A. The search expression can be provided by other means other than the query generator 150. For example, a user can submit a GQL search expression or a LDAP filter expression directly into the search bar as user-supplied input, thus foregoing any need of a query generator to construct the search expression from the user input. As another example, a different type of query generator can produce the search expression without parsing the user input.

At step 254, the search expression is examined to determine whether its format is an LDAP filter expression or a GQL expression. If the search expression is in a LDAP filter expression form, the search expression becomes translated (step 258) into a GQL expression. At step 262, the query processor 200 creates the parser 208 based on the grammar 204. At step 266, the search expression is passed to the parser 208. The parser 208 also generates (step 270) the expression tree generator 212, i.e., node factory, and parses (step 274) the search expression to produce the expression tree 216, using the expression tree generator 212 to produce the various types of nodes.

In the generation of the expression tree 216, the parser 208 determines which repositories support the one or more attributes in the search expression. To make this determination, the parser 208 can employ node factories that determine which repositories host the one ore more attributes by consulting information derived from the installed repository configuration files. The parser 208 includes this repository-location information in the expression tree as attribute metadata associated with each of the attribute nodes. At step 278, the query processor 250 initiates the search by calling a root node of the expression tree 216 (the expression tree serves as a query object). At step 282, the expression tree 216 returns the member set resulting from the search of the various repositories 54 to the Member Manager 32.

Figure 7:
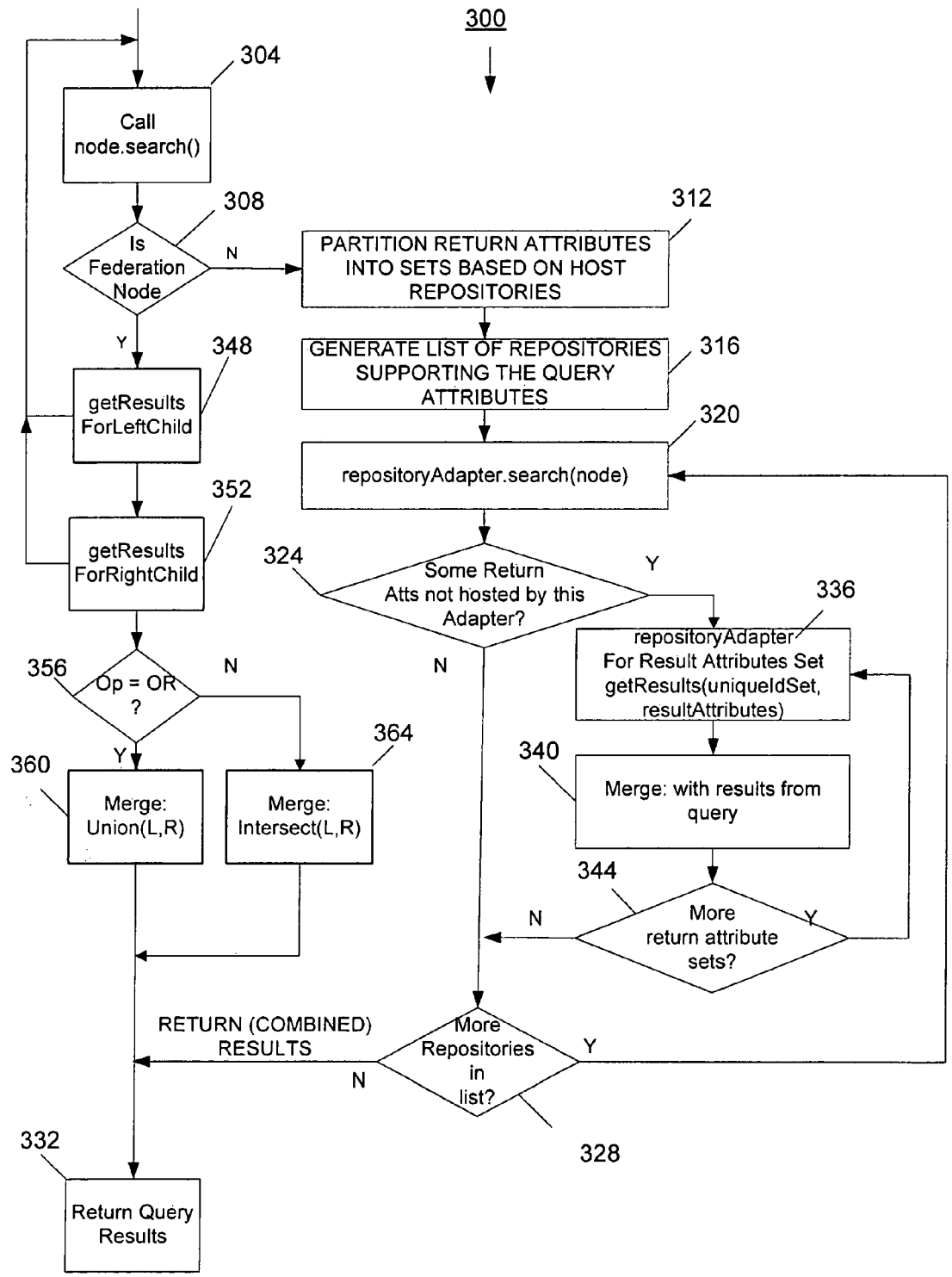
FIG. 7 is a flow diagram of an embodiment of a process executed by the expression tree in the performance of the search.

FIG. 7 shows an embodiment of a process 300 for performing a search of heterogeneous repositories in accordance with the invention. Processing of parenthetical nodes is omitted in this figure. In brief overview, the query processor 250 of the Member Manager 32 produces an expression tree from the search expression and calls (step 304) the search method (e.g., node.search()) of a node in the expression tree. Initially, this node is the root node of the expression tree. Nodes may have child nodes. Thus, calling a search against a node may be equivalent to calling a search against one or more sub-trees. In general, searching occurs in a recursive-descent traversal of the expression tree 216, that is, each node in the expression tree issues the search call to each child node of that node. A search of the virtual repository performed in response to a query expression is completed in a single traversal of the expression tree.

If the node is not a federation node (step 308), the return attributes are partitioned (step 312) into sets based on the repositories hosting those return attributes. At step 316, a list of repositories supporting the search (i.e. query) attributes is generated. Based on this list, the node directs (step 320) an appropriate repository adapter to search an associated repository. This repository adapter translates the search expression (or a portion thereof) into a query expression recognizable by the associated repository and acquires the search results from that repository.

When this repository adapter hosts all of the return attributes (step 324), and there are no other repositories in the list (step 328), then the results of the query are returned (step 332). If, instead, another repository is in the list (step 328), the node directs (step 320) the repository adapter associated with this repository to perform a search. This repository adapter translates the search expression (or a portion thereof) into a query expression recognizable by this other repository and acquires the search results. If there are no other repositories in the list (step 328), then the combined results obtained by the repository adapters are returned (step 332).

If, instead, at step 324, the repository adapter does not host one or more of the return attributes, a search is made (step 336) by the repository adapter hosting one of such "unhosted" return attributes. This search can be considered a directed search because it uses unique identifiers (UIDs) returned from the search performed in step 320 to identify directly members to be retrieved from the repository supporting the unhosted attribute. The results of this directed search are merged (step 340) with the query results obtained by step 320. Thus, at step 340, vertically partitioned data are combined with the horizontally partitioned data. At step 344, the searching of vertically partitioned repositories and merging of vertically partitioned data with horizontally partitioned data repeats for each unhosted return-attribute set. Accordingly, the search process can iterate through multiple vertically partitioned repositories for each of the horizontally partitioned repositories.

If, instead, at step 308, the node is a federation node, the search propagates (step 348) to a left-child node in the left child sub-tree of this federation node. At step 304, the node.search() method of this left-child node is called. If this left-child node is also a federation node (step 308), the search propagates recursively to the left-child sub-tree of this left-child node. If, instead, this left-child node is not a federation node, search results are obtained as described above (i.e., from steps 312 through to step 344). When these search results are returned (step 332), performance of the search resumes at step 352.

At step 352, the search propagates to a right-child node in the right sub-tree of the federation node. At step 304, the node.search() method of this right-child node is called. If this right-child node is also a federation node (step 308), the search propagates recursively to the left-child sub-tree of this right-child node, and the search progress as described above with respect to step 348. If, instead, this right-child node is not a federation node, search results are obtained as described above (i.e., from steps 312 through to step 344). When these search results are returned (step 332), performance of the search resumes at step 356.

At step 356, the federation node determines whether to use a logical OR operation to to combine the search results produced by the left sub-tree and the right sub-tree. If the operator is a Boolean OR operator, the federation node performs (step 360) a union of the results returned by the left sub-tree and the results returned by the right sub-tree. Otherwise, the federation node obtains (step 364) the intersection of the results of the left sub-tree with the results of the right sub-tree (i.e., to perform a logical AND operation). The federation node then returns (step 324) these results to the Member Manager (if the federation node is the root node of the expression tree) or to the parent node that called this federation node.

The following examples illustrate the process 300 with specific search expressions. For these examples, reference is made to FIG. 6B. Consider for a first exemplary illustration that the search expression is "(sn=Keats) OR (sn=Shakespeare)". An expression tree corresponding to this search expression appears as a sub-tree 400 in FIG. 6B (within dashed box), with the root node of this expression tree being logical node 228-1. (For the sake of this example, the remainder of the expression tree 216 in FIG. 6B is ignored, i.e., not part of the expression tree currently being discussed). When the same repository or repositories host all of the attributes in the search expression, the expression tree does not have any federation nodes. Here, both the LDAP and DB repositories support the "sn" attribute, and the expression tree 400 does not have any federation nodes.

For an expression tree with no federation nodes, the entire search expression (in this example, "(sn=Keats) OR (sn=Shakespeare)") is passed to the LDAP and DB adapters responsible for performing the search. These adapters translate the search expression into a corresponding repository-specific query expression. Here, the LDAP adapter 40 translates the search expression into an LDAP filter expression, e.g., (&(sn=Keats)(sn=Shakespeare)), and the DB adapter 44 translates the search expression into a DB/SQL query expression with a WHERE clause containing the sub-string, e.g., (sn=Keats) AND (sn=Shakespeare). In this simple example, the sub-string in the DB/SQL WHERE clause is similar to the string-based search expression because the translation did not involve any validation or mapping of attributes.

The LDAP adapter 40 submits the translated LDAP filter expression to the LDAP repository 56, and the DB adapter 44 submits the DB query expression to the DB repository 60. Because each repository adapter receives the entire search expression, the expression tree does not need to merge partial results, as described in step 340 above. The adapters 40, 44 return the resulting member sets to the expression tree 400, which returns the combined member set to the Member Manager 32.

As another example, consider the entire expression tree 216 in FIG. 6B. If the search expression has a horizontally partitioned attribute and at least one vertically partitioned attribute (e.g., hosted by the LA repository), the expression tree 216 has at least one federation node, i.e., the children sub-trees of this federation node have attributes supported by different repositories. In this example, the search expression (sn=Keats) OR (sn=Shakespeare) OR (buildingCode=5)" has one attribute (i.e., "sn") that is supported in the horizontally partitioned LDAP and DB repositories and another attribute (i.e., "buildingCode") that is supported by the vertically partitioned LA repository. Consider also for purposes of this example that the return attributes are "sn," "givenname," and "buildingCode," and that LDAP and DB repositories support "givenname" in addition to "sn."

During a search, the federation node 224 issues sub-expressions (i.e., less than the full search expression) as appropriate for each particular adapter, that is, the federation node 224 passes in only those search attributes supported by the repositories. Whereas only an applicable portion of the search expression is issued to each sub-tree, all of the return attributes in the query expression are issued as well. Here, the federation node 224 issues the "(sn=Keats) OR (sn=Shakespeare)" portion of the search expression to the LDAP and DB adapters because both the LDAP and DB repositories support "sn". Each of these adapters translates this portion of the search expression into a query expression appropriate for its type of associated repository, and issues the query expression to its associated repository to obtain member set results.

In addition to producing these member set results, each LDAP and DB adapter returns a unique identifier (UID) for each member in the member set returned during each respective search of the LDAP and DB repositories. For example, the search of the LDAP repository can discover five members that satisfy the sub-expression "(sn=Keats) OR (sn=Shakespeare)" and the search of the DB repository can discover two members. Accordingly, the LDAP adapter returns five UIDs and the DB repository returns two UIDs.

Because the query expression includes a return attribute (here, buildingCode) that neither the LDAP adapter nor the DB adapter hosts, the LA adapter performs a directed search of the LA repository using the returned UIDs. Using the previous numerical examples, the five UIDs obtained from the LDAP repository are used to retrieve buildingCode information from the LA repository for the five corresponding members. Similarly, the two UIDs obtained from the DB repository are used to retrieve buildingCode information from the LA repository for the two corresponding members.

For each member identified by the LDAP adapter, the buildingCode information retrieved from the LA repository for that member is merged with the "sn" and "givenname" data retrieved from the LDAP repository for that member. Similarly, for each member identified by the DB adapter, the buildingCode information retrieved from the LA repository for that member is merged with the "sn" and "givenname" data retrieved from the DB repository for that member. Thus, horizontally partitioned data retrieved from the LDAP and DB repositories are merged with vertically partitioned data retrieved from the LA repository.

This search operation of merging horizontally partitioned data with vertically partitioned data extends iteratively to more than two horizontally partitioned repositories. To illustrate, when a search of a horizontal repository occurs, that search produces a member set result and corresponding UIDs. These UIDs are then used to perform a directed search of the LA repository. The results obtained from the LA repository are combined with those of the horizontal repository. This process repeats for each of the other horizontal repositories until the search results from each of the horizontal repositories have been used to retrieve information from the vertical repository.

This search operation also extends iteratively to two or more vertically partitioned repositories. To illustrate, when a search of a horizontal repository occurs, that search produces a member set result and corresponding UIDs. These UIDs are used to perform a directed search of a first one of the vertical repositories. The results obtained from this vertical repository are then combined with those of the horizontal repository. These UIDs are then used to perform a directed search of a second vertical repository. The results obtained from this second vertical repository are then combined with the combined results of the horizontal repository with the first repository. This process repeats for each of the other vertical repositories. In addition, if there are multiple horizontal repositories, the process repeats until the search results from each of the horizontal repositories have been used to retrieve information from the multiple vertical repositories.

The federation node 224 also issues a sub-expression (i.e., "buildingCode=5) containing the vertically partitioned attribute to the right child sub-tree. The LA adapter 48 receives this search sub-expression and returns the member set results satisfying this sub-expression.

Because the query expression includes two return attributes (here, sn and givenname) that are not hosted by the LA adapter, directed searches of the LDAP and DB repositories are performed using the UIDs returned by the LA adapter. Vertically partitioned data returned from the search of the LA repository are merged with horizontally partitioned data returned by these directed searches of the LDAP and DB repositories.

The federation node 224 then merges the member set results obtained from the left child sub-tree with the member set results obtained from the right child sub-tree. The results obtained from the left and right child sub-trees are aggregated for a logical OR operation or intersected for a logical AND operation. After merging the member-set results from the children sub-trees, the federation node 224 returns the resulting member set to the Member Manager 32. The Member Manager 32 passes this member set to the client application 14, which displays the results according to a predetermined view.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method for performing a search of a virtual repository formed from a plurality of repositories, each repository of the virtual repository being associated with a separate database system, the method comprising:

receiving a string-based search expression;

generating an expression tree of nodes based on the string-based search expression, one or more of the nodes of the expression tree being an attribute node, each attribute node corresponding to an attribute included in the string-based search expression;

adding repository-location information to the expression tree by associating metadata with each attribute node in the expression tree, the metadata associated with a given attribute node identifying one or more repositories of the virtual repository that support the attribute represented by that attribute node;

generating, for each repository identified by the metadata associated with the one or more attribute nodes, a query expression specifically for that repository; and determining whether sub-trees of a particular node of the expression tree have attribute nodes associated with metadata identifying different types of repositories, and, if the metadata associated with the attribute nodes identify different types of repositories, constructing the particular node as a federation node for merging search results returned by the child sub-trees;

searching each repository identified by the metadata associated with the one or more attribute nodes using the query expression specifically generated for that repository.

2. The method of claim 1, further comprising initiating a search by calling a root node of the expression tree; and performing the search in a single recursive descent traversal of the nodes in the expression tree.

3. The method of claim 1, wherein the virtual repository includes one or more horizontally partitioned repositories and one or more vertically partitioned repositories.

4. The method of claim 1, further comprising merging a search result obtained from a horizontally partitioned repository with a search result obtained from a vertically partitioned repository.

5. The method of claim 1, further comprising distributing a first portion of the string-based search expression to a first sub-tree in the expression tree based on metadata associated with each attribute node of the first sub-tree and a second portion of the string-based search expression to a second sub-tree in the expression tree based on metadata associated with each attribute node of the second sub-tree.

6. The method of claim 1, further comprising translating at least a portion of the string-based search expression into the query expression generated specifically for each type of repository to be searched.

7. The method of claim 1, wherein the step of associating metadata with the attribute node includes accessing at least one configuration file to determine which of the repositories support the attribute corresponding to the attribute node.

8. A server system for performing a search of a virtual repository formed from a plurality of repositories, each repository of the virtual repository being associated with a separate database system, the server system comprising a server computer having:

a query processor apparatus receiving from a client computer having an initiator a string-based search expression, the query processor apparatus including a parser for generating an expression tree of nodes based on the string-based search expression, one or more of the nodes of the expression tree being an attribute node, each attribute node corresponding to an attribute included in the string-based search expression, the parser adding repository-location information to the expression tree by associating each attribute node with metadata to identify the repositories of the virtual repository that support the one or more attributes included in the search expression, each repository of a plurality of repositories being identified by the metadata associated with the one or more attribute nodes;

one or more repository adapters generating, for each repository identified by the metadata associated with the one or more attribute nodes, a query expression specifically for that repository based on the string-based search expression; and wherein the parser determines whether sub-trees of a particular node of the expression tree have attribute nodes associated with metadata identifying different types of repositories, and, if the metadata associated with the attribute nodes identify different types of repositories, constructs the particular node as a federation node for merging search results obtained by the sub-trees, and searching each repository identified by the metadata associated with the one or more attribute nodes using the query expression specifically generated for that repository, wherein the query processor apparatus returns a search result to the initiator of the string-based search expression.

9. The server system of claim 8, wherein the parser initiates a search based on the search expression by calling a root node of the expression tree.

10. The server system of claim 8, wherein a node of the expression tree distributes a first portion of the string-based search expression to a first sub-tree in the expression tree based on metadata associated with each attribute node of the first sub-tree and a second portion of the string-based search expression to a second sub-tree in the expression tree based on metadata associated with each attribute node of the second sub-tree.

11. The server system of claim 8, wherein each repository adapter translates at least a portion of the string-based search expression into the query expression specifically generated for one of the repositories to be searched.

12. A computer program product for use with a computer system to perform a search of a virtual repository formed from a plurality of repositories, each repository of the virtual repository being associated with a separate database system, the computer program product comprising a computer useable medium having embodied therein program code comprising:

program code for receiving a string-based search expression;

program code for generating an expression tree of nodes based on the string-based search expression, one or more of the nodes of the expression tree being an attribute node, each attribute node corresponding to an attribute included in the string-based search expression; and program code for adding repository-location information to the expression tree by associating metadata with each attribute node in the expression tree, the metadata associated with a given attribute node identifying one or more repositories that support the attribute represented by that attribute node, each repository of the plurality of repositories being identified by the metadata associated with the one or more attribute nodes;

program code for generating for each repository identified by the metadata associated with the one or more attribute nodes a query expression specifically for that repository based on the string-based search expression;

program code for searching each repository identified by the metadata associated with the one or more attribute nodes using the query expression specifically generated for that repository and program code for determining whether sub-trees of a particular node of the expression tree have attribute nodes associated with metadata identifying different sets of repositories, and, if the metadata associated with the attribute nodes identify different sets of repositories, program code for constructing the particular node as a federation node to merge search results returned by the sub-trees.

13. The computer program product of claim 12, further comprising program code for initiating a search based on the search expression by calling a root node of the expression tree.

14. The computer program product of claim 12, further comprising program code for translating at least a portion of the string-based search expression into a query expression specifically generated for each repository to be searched.

15. The method of claim 1, wherein the string-based search expression is repository neutral.

16. The method of claim 1, further comprising translating the string-based search expression into a repository-neutral format.

17. The method of claim 16, wherein the repository-neutral format is a generic query language (GQL) format.

* * * * *